Aug. 16, 1949.  C. P. CUENI  2,479,476
COMPOSITE STRUCTURE EMBODYING SHEAR CONNECTORS
Filed April 25, 1944  3 Sheets-Sheet 1

INVENTOR.
CLEMENT P. CUENI
BY
H. C. Berman
ATTORNEY

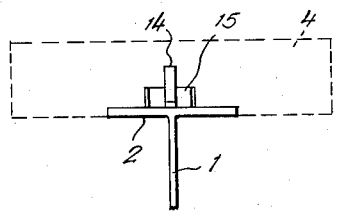
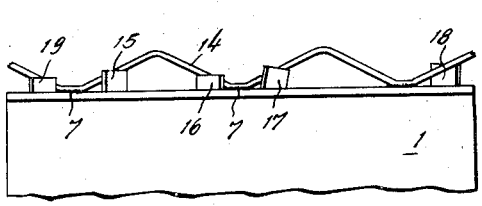
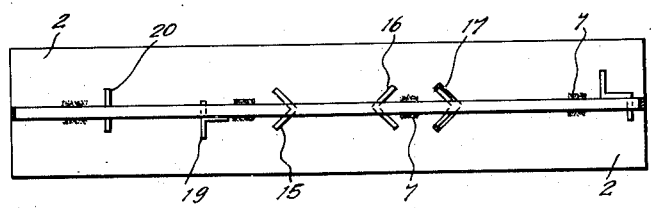
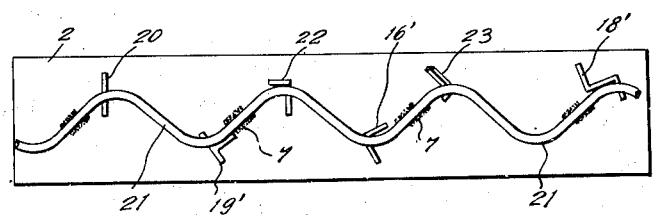

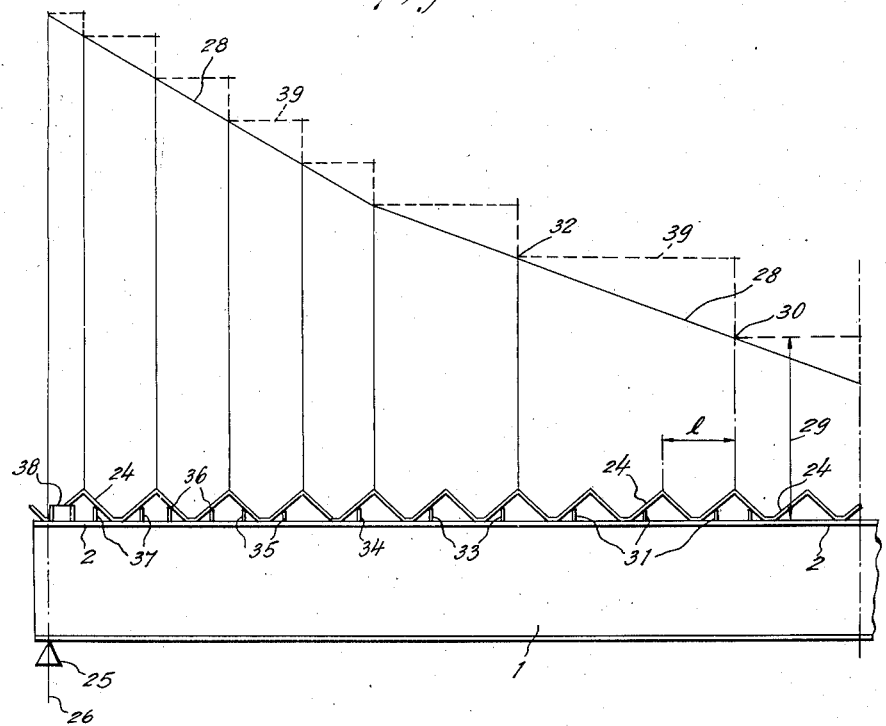
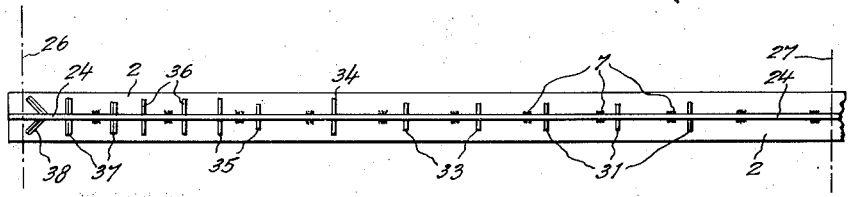

Patented Aug. 16, 1949

2,479,476

UNITED STATES PATENT OFFICE 2,479,476

COMPOSITE STRUCTURE EMBODYING SHEAR CONNECTORS

Clement P. Cueni, Rutherford, N. J., assignor to Porete Mfg. Company, North Arlington, N. J., a corporation of New Jersey Application April 25, 1944, Serial No. 532,608

9 Claims. (Cl. 72—70)

1

The present invention is directed to composite structures consisting essentially of metal beams and reinforced concrete slabs supported by the same and united thereto by shear reinforcements.

It has been customary for a number of years to provide structures of this kind wherein the upper flanges of the steel beams, either rolled or fabricated, were provided with shear connectors in the shape of a helix, usually called a spiral, or in the shape of a waved line, or of any other serpentine or sinuous form, as set forth in Patent 2,016,616, dated October 8, 1935. These steel rods were welded to the top flange of the steel beams and well embedded in the concrete. Such shear connectors have proved to be very efficient in actual constructions and in tests. However, in numerous tests it was brought out that all these bar connectors have one weak spot, namely, at the points where the spiral is welded to the flange. This occurs sometimes due to defective welding which may result in burning away some of the metal or changing the fiber of the metal, and thus create a weakness at the points where maximum strength is necessary.

The present invention is intended and adapted to provide a structure of shear reinforcement which has all of the advantages of the continuous type and which obviates the disadvantages thereof, it being among the objects thereof to provide a composite structure having shear reinforcement which is continuous, easy to apply, and has maximum strength at the areas of maximum stress.

It is also among the objects of the present invention to provide a shear reinforcement which may be cut from standard pieces with a minimum of waste, which is economical to produce, and which may be easily and readily welded to the beam in the field.

In practicing the present invention, a number of considerations must be taken into account. The minimum unit stress in the described bar connectors is approximately at their highest point between two welds, and the maximum unit stress near the welds. This point on the bars close to the welds is weakened by the welding. The welder by striking the arc to start the weld may burn some of the bar off, and the welding heat makes the bar steel more brittle and thus more liable to break, especially under repeated loading. Thus, the points near the welds are considerably weaker than the rest of the bar, and if this condition can be changed the shear connector becomes more effective and more reliable.

Theoretical investigation has indicated, and actual tests have demonstrated, that there is also a weak spot for the concrete near the welds, especially so on the compression side of each weld of a continuous bar connector. When load is applied on a composite structure the bond of the concrete to the top flange of the beam is first destroyed and then the shear connector begins to act, because it is then the only means that can prevent relative movement between the steel beam and the concrete slab. This is achieved partly by pressure exerted by the concrete on the bar. If the pressure increases until the elastically embedded bar begins to bend, there will be some relative movement between concrete and steel beam and the local pressure on the concrete near the welds will increase considerably. Finally an excessive bedding pressure on the concrete near the welds results, followed by a crushing of the concrete, which in turn will cause an increase in the bending of the bar, which is no more protected by strong concrete. This results in the breaking phenomena as follows: Formation of cracks in the concrete with ultimate breakage of the connector bars near the welds. It is concluded, therefore, that a more rigid bar near the welds, or a bar that presents a larger compression area to the concrete near the welds, or a bar that is reinforced near the welds does not only help the bar, but also the concrete, and will increase the efficiency of a connector considerably.

Such a strengthening of the connector bars near the welds can be achieved by using bars of variable cross section bent in such a way that the heavier cross section is at the bottom where the bars are welded to the steel beam.

It also can be achieved by strengthening the bar connector by using with it a small rigid shear connector welded to the top flange of the steel beam as close to the welds of the bar connectors as possible.

In the accompanying drawings constituting a part hereof, and in which like reference characters indicate like parts:

Fig. 4 shows a transverse, cross-sectional view of a composite section, the concrete slab being shown in dotted lines;

Fig. 5 shows a longitudinal view of the section shown in Fig. 4;

Fig. 6 shows a plan view of the same section;

Fig. 7 a plan view of a similar section, using a different form of continuous bar;

Fig. 8 shows a longitudinal cross-sectional view of a beam with shear reinforcement adjusted to the actual shear; and Fig. 9 shows a plan view of the same section.

Figure 1:
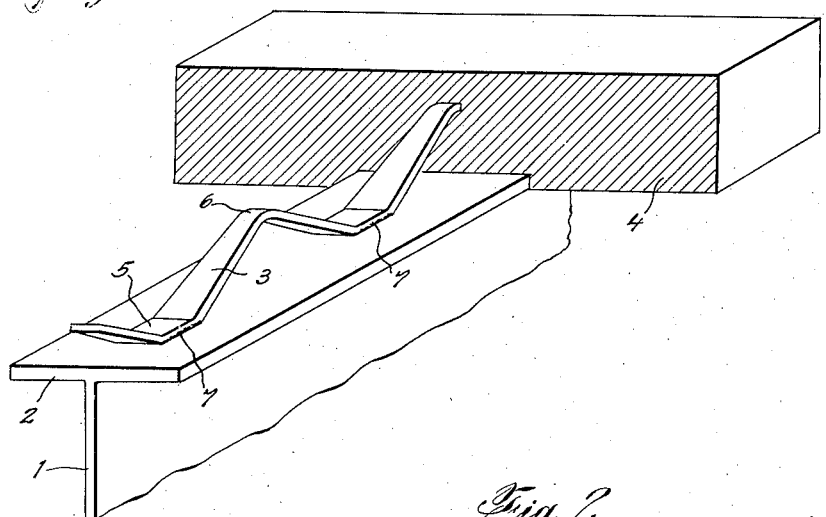
Fig. 1 is a perspective view of a beam with a serpentine shaped shear connector of variable cross section, together with a portion of the concrete slab which rests thereon and is united thereto.

A composite section generally consists of a steel beam 1, only partly shown in Fig. 1, a top flange 2, a shear connector 3, and a concrete slab 4. Shear connector 3 is cut from a sheet of metal in such a way that a bar or strip is formed where a greater width 5 alternates with a smaller width 6 and then the bar is bent and welded to the top flange 2 in such a way that the wider part 5 contacts the top flange 2, and the smaller part reaches up into the concrete slab 4. The welds 7 are at the wide part 5 of the bar, so that if the welding weakens the material the bar will have enough strength left to perform its purpose. At the same time the greater width of the bar provides a larger compression area for the concrete near the welds where it is most required. Such a bar connector eliminates the weak points of the heretofore used shear connectors of spiral or serpentine shape, and, per unit weight, is much more efficient and therefore more economical.

Figure 2:
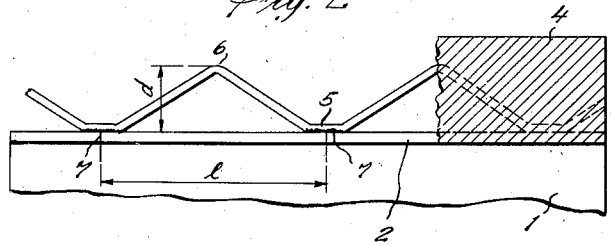
Fig. 2 is a longitudinal cross sectional view of the structure of Fig. 1, showing only a portion of the concrete slab.

In order to make the welding 7 easier, the shear reinforcement bar is bent in such a way that the wide part represents a straight flat area, fitting well the top flange 2 of beam 1. A serpentine shaped connector of the prior art consisting of a round or square bar is liable to split the concrete, and, as explained before, has a weak spot for the steel and the concrete near the welds. A connector as shown in Figs. 1 and 2 does not have these disadvantages. At the contact areas with the top flange this connector is so much widened that it will not matter much if the welder burns part of it off. The bar is so wide at the place of the two welds that not all of the material will become brittle by the welding heat. A compression surface of considerable width is presented to the concrete so there is no danger that the local pressure of the concrete near the welds becomes critical. Due to the considerable width of the bar there is less danger of splitting the concrete.

Figure 3:
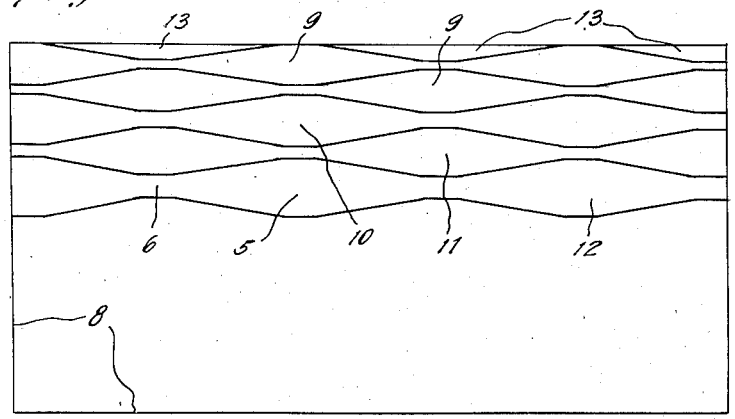
Fig. 3 shows a sheet of metal from which the connectors shown in Figs. 1 and 2 can easily be cut with a minimum of waste of material.

The connectors according to the present invention are therefore more efficient and require less material, as they can be cut without much waste from sheet metal. How this can easily be done is shown in Fig. 3. From a steel plate 8, or piece of sheet metal, connectors 9, 10, 11 and 12 can be cut off leaving only the waste shown by the small pieces 13. The cutting will require special shearing plates or cutters, but with one set, a series of shear connectors that can meet quite a number of different conditions, can be made. The thickness of the steel plate can be increased for greater unit shear, or the width of the strips can be increased as shown by 10, 11 and 12. Two connectors or more can be welded parallel to each other and longitudinally on top of a beam.

If the depth $d$ of the connector, as shown in Fig. 2 has to be increased, the length of the pitch $l$ can be reduced. For instance the same length of bar is required for a connector with $d=6''$ and $l=8''$ as is for a connector with $d=4''$ and $l=12''$, or $d=5''$ and $l=10.5''$.

In principle a bar of variable cross section could also be used to manufacture a shear connector of helical shape; however, the difficulties encountered in making the spiral in such a way that the heavier part of the bar is at the contact points with the top flange are much greater than bending a bar of variable cross-section into serpentine shape.

Another way to reinforce the continuous bar connectors, and achieve the improvements described before is shown in Figs. 4, 5 and 6. Shear connector 14 consisting of a rectangular bar of serpentine shape is welded to the top flange 2 of the I-beam 1. A round bar could be used as well, though the rectangular bar presents a larger compression area to the concrete.

A small piece of angle 15 is placed under bar 14, tack welded thereto and also welded to the top flange 2, as close as possible to the connector weld 7. Such small angles can be welded on both sides of the connector weld as shown by 16 and 17. They may be perpendicular to the top flange 2, as shown by 16 or inclined toward the center of the beam as shown by 17. Instead of angles small Z shapes 18 may also be used, or small T shapes 19. Because the depth of the stiffening connectors is very small a triangular or rectangular plate 20 may be as efficient as the angles and the T and Z shapes, if the plate is well tack welded to the connector bar 14.

All these stiffening connectors used as shown in Figs. 4 to 6 stiffen the bar connector near its weakest point, prevent the concrete from being locally overstressed near the welds and also reduce the danger of the concrete being split by the bar connector. Because these stiffening connectors present a comparatively large compression area to the concrete they help considerably in transmitting the horizontal shear into the concrete slab. Therefore, they do not cause an additional expense. The bar connector is designed for the remaining shear only and the saving in cost in the bar connector well offsets the cost of the stiffening connectors.

Fig. 7 shows that the stiffening connectors 16', 18', 19' and 20' can easily be applied to a helix shaped shear reinforcement or connector 21 fastened by welds 7 to the top flange 2. Instead of equal legged angles 15 and 17, angles with unequal legs 22 and 23 may be used.

It is very seldom that a composite section has a uniform unit horizontal shear throughout the full length. The unit horizontal shear is usually at its maximum at the supports and decreases toward the center of the span. It is complicated to adjust the continuous bar connectors to the actual shear because these bar connectors cannot be made economically with a variable pitch. By using stiffening connectors together with the continuous bar connectors the shear reinforcement of a composite beam can easily and economically be adjusted to the actual shear. An example of such a shear reinforcement is shown in Figs. 8 and 9.

Beam 1 rests on support 25 of which 26 shows the center line. 27 is the center line of the span. Line 28 is the computed shear line. The continuous shear bar connector 24 is designed for a unit shear of 29. This uniform shear line intersects the actual shear line at point 30, which means that from this point on to the left, the shear connector 24 is insufficient for transmitting the horizontal shear. A heavier bar connector could be used from here on, or the pitch $l$ of the connector could be reduced. As an alternative, a small stiffening plate 31 is welded to the flange 2, as close as possible to welds 7 of the bar connector 24. This plate not only stiffens the bar connector 24, but also transmits some shear through compression on the concrete. At point 32 the combined capacity of transmitting shear of bar connector 24 and stiffening connectors 31 is used up. Therefore, the height of the stiffening connectors 33 may be increased and also the width of stiffening connector 34. If one stiffening connector is unable to make up the difference between the computed unit shear and the shear that can be transmitted by the bar connector, two stiffening connectors may be used per pitch of bar connector, one on each side of weld 7, as shown by connectors 35. One of the two may be of smaller dimensions. For the next bar pitches the compression areas of the stiffening connectors are gradually increased to take care of the increasing horizontal shear, as shown by connectors 36 and 37.

Angles 38 may be used as well as plates. The connectors 37 and 38 are inclined toward the center of the span to help the bar connector 24 to prevent uplift of the concrete slab. As shown by dotted line 39 the actual shear reinforcement can closely be adjusted to the computed shear line 28, either every pitch or every second or third pitch of the continuous bar connector.

The illustrations shown shall in no way restrict the invention. Other stiffening connectors may be used and the manner of application and the arrangement may vary. Other types of bar connectors with variable cross section may be used to achieve the purpose of improving the heretofore used continuous connectors. The beams may be rolled or fabricated and both the beams and the connectors may be of a metal other than steel. The composite structures may include the usual reinforcing rods or mesh commonly used in concrete, in addition to the shear connectors. Although a number of different forms of small connectors have been described, many other forms are suitable for the present purpose. By the term "welded" or the like used in the claims, it is intended to include the various known methods, such as torch welding, electric welding, contact or pressure welding, and the like.

These and other variations in the details of the invention may be made within the spirit thereof, and the invention is to be broadly construed and to be limited only by the character of the claims appended hereto.

What I claim is:

1. In a composite metal-concrete structure a metal beam having an upper flange, a continuous sinuous metal shear reinforcement welded on said flange, said reinforcement contacting said flange at a plurality of spaced intervals along the centerline of said flange and welded thereto at the areas of said contacts, the portions of said reinforcement intermediate said areas extending upwardly a substantial distance above said flange, said reinforcement comprising a flat bar, the under face of said bar being flat on said flange and providing said contacts.

2. In a composite metal-concrete structure a metal beam having an upper flange, a continuous sinuous metal shear reinforcement welded on said flange, said reinforcement contacting said flange at a plurality of spaced intervals along the centerline of said flange and welded thereto at the areas of said contacts, the portions of said reinforcement intermediate said areas extending upwardly a substantial distance above said flange, said reinforcement comprising a flat bar, the under face of said bar being flat on said flange and providing said contacts, said welds being at the lateral edges only of said bar.

3. In a composite metal-concrete structure a metal beam having an upper flange, a continuous sinuous metal shear reinforcement welded on said flange, said reinforcement contacting said flange at a plurality of spaced intervals and welded thereto at the areas of said contacts, the portions of said reinforcement intermediate said areas extending upwardly a substantial distance above said flange, said reinforcement comprising a flat bar, the under face of said bar being flat on said flange and providing said contacts, the width of said bar being greatest at said areas and decreasing intermediate said areas.

4. In a composite metal-concrete structure a metal beam having an upper flange, a continuous sinuous metal shear reinforcement welded on said flange, said reinforcement contacting said flange at a plurality of spaced intervals and welded thereto at the areas of said contacts, the portions of said reinforcement intermediate said areas extending upwardly a substantial distance above said flange, said reinforcement comprising a flat bar, the under face of said bar being flat on said flange and providing said contacts, the width of said bar being greatest at said areas and being least at the highest point between said areas.

5. In a composite metal-concrete structure a metal beam having an upper flange, a continuous sinuous metal shear reinforcement welded on said flange, said reinforcement contacting said flange at a plurality of spaced intervals and welded thereto at the areas of said contacts, the portions of said reinforcement intermediate said areas extending upwardly a substantial distance above said flange, said reinforcement comprising a flat bar, the under face of said bar being flat on said flange and providing said contacts, the amount of metal of said bar at said areas being greater per unit length than intermediate said areas.

6. In a composite metal-concrete structure a metal beam having an upper flange, a continuous sinuous metal shear reinforcement welded on said flange, said reinforcement contacting said flange at a pluraliy of spaced intervals and welded thereto at the areas of said contacts, the portions of said reinforcement intermediate said areas extending upwardly a substantial distance above said flange, said reinforcement comprising a flat bar, the under face of said bar being flat on said flange and providing said contacts, said bar having a greater transverse cross sectional area at said areas than intermediate said areas.

7. In a composite metal-concrete structure a metal beam having an upper flange, a continuous sinuous metal shear reinforcement welded on said flange, said reinforcement contacting said flange at a plurality of spaced intervals and welded thereto at the areas of said contacts, the portions of said reinforcement intermediate said areas extending upwardly a substantial distance above said flange, said reinforcement comprising a flat bar, the under face of said bar being flat on said flange and providing said contacts, and relatively small shear connectors welded to said flange adjacent to said welds.

8. In a composite metal-concrete structure a metal beam having an upper flange, a continuous sinuous metal shear reinforcement welded on said flange, said reinforcement contacting said flange at a plurality of spaced intervals and welded thereto at the areas of said contacts, the portions of said reinforcement intermediate said areas extending upwardly a substantial distance above said flange, said reinforcement comprising a flat bar, the under face of said bar being flat on said flange and providing said contacts, and relatively small shear connectors welded to said flange adjacent to said welds, said connectors having flat faces and relatively narrow edges and being welded in upstanding positions.

9. In a composite metal-concrete structure a metal beam having an upper flange, a continuous sinuous metal shear reinforcement welded on said flange, said reinforcement contacting said flange at a plurality of spaced intervals and welded thereto at the areas of said contacts, the portions of said reinforcement intermediate said areas extending upwardly a substantial distance above said flange, said reinforcement comprising a flat bar, the under face of said bar being flat on said flange and providing said contacts, and relatively small shear connectors welded to said flange adjacent to said welds, said connectors having flat faces and relatively narrow edges and being welded in upstanding positions under said reinforcement intermediate said areas.

CLEMENT P. CUENI.

REFERENCES CITED

The following references are of record in the file of this patent:

UNITED STATES PATENTS

| Number | Name | Date |
|---|---|---|
| 768,285 | Kahn | Aug. 23, 1904 |
| 1,885,883 | Young | Nov. 1, 1932 |
| 2,016,616 | Schaub | Oct. 8, 1935 |
| 2,132,220 | Powers | Oct. 4, 1938 |
| 2,211,513 | Nagin | Aug. 13, 1940 |
| 2,340,176 | Cueni et al. | Jan. 25, 1944 |

FOREIGN PATENTS

| Number | Country | Date |
|---|---|---|
| 84,426 | Sweden | Sept. 24, 1935 |